US012055881B2

(12) United States Patent
Suzuki

(10) Patent No.: US 12,055,881 B2
(45) Date of Patent: Aug. 6, 2024

(54) IMAGE FORMING APPARATUS

(71) Applicant: CANON KABUSHIKI KAISHA, Tokyo (JP)

(72) Inventor: Shinya Suzuki, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/130,738

(22) Filed: Apr. 4, 2023

(65) Prior Publication Data

US 2023/0314996 A1 Oct. 5, 2023

(30) Foreign Application Priority Data

Apr. 5, 2022 (JP) ................................ 2022-063111

(51) Int. Cl.
*G03G 15/00* (2006.01)
*G03G 15/02* (2006.01)
*G03G 15/043* (2006.01)

(52) U.S. Cl.
CPC ..... *G03G 15/5041* (2013.01); *G03G 15/0266* (2013.01); *G03G 15/043* (2013.01); *G03G 15/5058* (2013.01); *G03G 15/5062* (2013.01); *G03G 2215/00042* (2013.01)

(58) Field of Classification Search
CPC ........... G03G 15/5041; G03G 15/5058; G03G 15/5062; G03G 15/043; G03G 2215/00029–00042; G03G 2215/00067; G03G 15/0266
See application file for complete search history.

(56) References Cited

U.S. PATENT DOCUMENTS

| | | | | |
|---|---|---|---|---|
| 6,686,943 B2 * | 2/2004 | Ishii | H04N 1/4078 | 347/133 |
| 2009/0238591 A1 * | 9/2009 | Watanabe | G03G 15/5037 | 399/51 |
| 2012/0045234 A1 * | 2/2012 | Suzuki | G03G 15/5058 | 399/49 |
| 2015/0192884 A1 * | 7/2015 | Sone | G03G 15/5058 | 399/72 |

FOREIGN PATENT DOCUMENTS

| | | |
|---|---|---|
| JP | 11-258872 A | 9/1999 |
| JP | 2010-050639 A | 3/2010 |

* cited by examiner

*Primary Examiner* — Carla J Therrien
(74) *Attorney, Agent, or Firm* — Venable LLP

(57) ABSTRACT

An image forming apparatus includes an image forming unit configured to form an image on a sheet. The image forming unit includes a photosensitive member; a charger configured to charge the photosensitive member based on a charging potential; an exposure unit configured to expose the photosensitive member charged by the charger to light to form an electrostatic latent image on the photosensitive member, an exposure intensity of the exposure unit being controlled based on an exposure condition; a developing sleeve configured to develop the electrostatic latent image; and one or more processors configured to perform operations including controlling the image forming unit to form a line test image and a width test image.

9 Claims, 9 Drawing Sheets

IMAGE FORMING APPARATUS

BACKGROUND OF THE INVENTION

Field of the Invention

The present disclosure relates to an image forming apparatus which forms a toner image on a recording material.

Description of the Related Art

Recently, an electrophotographic image forming apparatus is beginning to be widely used in the printing industry, and demands for high speed output and high image quality are rapidly increasing. In the demand related to the high image quality, there is a strong demand concerning characters and fine lines, and it is important to set an appropriate line width to suppress faintness of small point characters or fine lines, and crushing of outlines of bold characters, such as gothic type characters.

Although there are many factors for determining line width in image forming, the line width of a fine line may become thick or thin in a charging process, a latent image forming process, a developing process, a transfer process, and a fixing process in the image forming process. For example, in a charging process or a latent image forming process, in a case where at least one of a potential condition by the charging unit and a light amount condition by an exposure unit is changed, a shape of an electrostatic latent image of the fine line on a photosensitive drum will change.

Further, in the developing process, due to a developing condition such as a distance between a photosensitive drum and a developing sleeve, a toner amount to be developed to the electrostatic latent image formed on the photosensitive drum may change, resulting in a change in line width.

In the transfer process, transferability from the photosensitive drum to an intermediate transfer belt and transferability from the intermediate transfer belt to the recording material may change. Further, in a case where there is a difference between a velocity of a photosensitive drum, a velocity of an intermediate transfer belt, and a velocity of a recording material, the line width changes as a toner image is stretched. In the fixing process, the line width also changes as the toner image on the recording material melts and spreads differently due to changes in a pressure force and in a heat amount of the fixing device. These phenomena are also caused by individual differences in imaging forming apparatuses and changes in conditions due to repeated image forming and the like. Further, these image forming conditions have an influence not only on the line width but also on image density.

Japanese Unexamined Patent Publication No. 11-258872 discloses an example of such a technique for correcting a line width of the fine line. In this technology, the density of an image for density detection, which is formed on one side of a recording material with 100% density and no gaps, is measured by density detection means provided opposite an intermediate transfer belt to correct a charging voltage of charging means. In this way, the density of the toner image is corrected in the electrophotographic apparatus. Further, when correcting the line width of the toner image, a half-tone image for line width detection is used, and the half-tone image for line width detection includes a plurality of one-dot lines formed in stripes at intervals of one to six dots between each line. By measuring density of the half-tone image using the above described density detection unit and correcting a laser power of an exposure unit, the line width of the toner images is corrected.

Further, Japanese Patent Application Laid-open No. 2010-050639 describes an image forming apparatus that converts multi-value image data into image data that is reproducible by a printer. This image forming apparatus includes a developing bias adjustment means configured to adjust the developing bias to output a line image having a predetermined width with a predetermined line width or predetermined density. This image forming apparatus includes an exposure amount adjustment means and an edge detection means. The exposure amount adjustment means is configured to adjust an exposure amount so that it can output a patch image acquired by a developing condition by a developing bias adjusted by the developing bias adjustment unit with a predetermined density. The edge detection means is configured to determine whether an interested pixel in the multi-value image data is an edge pixel or not. This image forming apparatus further includes an exposure amount change unit configured to change, according to the detection result of the edge detection means, an exposure amount of the interested pixel determined based on the exposure amount that is adjusted by the exposure amount adjustment means. Due to this configuration, the multi-value image data can be converted into the image data reproducible by a printer.

However, in Japanese Patent Application Laid-open No. 11-258872, in a case where the density of the half tone image for line width detection is high, it may not be possible to distinguish between a fine line with a wide line width and a fine line with a high density; therefore, it may not be possible to achieve a desired line width control. The line width and solid density of a fine line may vary according to any of an exposure condition and a bias condition in electrification and development.

On the other hand, in the methods described in Japanese Patent Application Laid-open No. 11-258872 and in Japanese Patent Application Laid-open No. 2010-050639, one of the exposure condition or development bias condition is determined based on the line width, then, the other of the exposure condition or development bias condition is determined based on a patch density of a 100% image ratio. Therefore, in these technologies, one of the exposure condition and development bias condition may not be adjusted to a desired condition.

SUMMARY OF THE INVENTION

An image forming apparatus according to the present disclosure includes an image forming unit configured to form an image on a sheet, the image forming unit comprising: a photosensitive member; a charger configured to charge the photosensitive member based on a charging potential; an exposure unit configured to expose the photosensitive member charged by the charger to light to form an electrostatic latent image on the photosensitive member, an exposure intensity of the exposure unit being controlled based on an exposure condition; a developing sleeve configured to develop the electrostatic latent image; and one or more processors configured to perform operations including: controlling the image forming unit to form a line test image and a width test image; wherein a length in a lateral direction, which is perpendicular to a longitudinal direction of the line test image, of the width test image is longer than a length in the lateral direction of the line test image, the line test image comprising: a first line image formed based on a first charging potential and a first exposure condition; a second line image formed based on a second charging potential, which is different from the first charging potential, and the first exposure condition; and a third line image formed based on the first charging potential and a second exposure condition, which is different from the first exposure condition, the width test image comprising: a first width image formed based on the first charging potential and the first exposure condition; a second width image formed based on the second charging potential and the first exposure condition; and a third width image formed based on the first charging potential and the second exposure condition, and generating the charging potential and the exposure condition based on a reading result of the line test image and a reading result of the width test image.

Further features of the present invention will become apparent from the following description of exemplary embodiments (with reference to the attached drawings).

DESCRIPTION OF THE EMBODIMENTS

In the following, embodiments of the present disclosure are described in detail with reference to the accompanying drawings. Although these embodiments are examples of preferred embodiments of the present disclosure, the present disclosure is not limited only to the configurations of these embodiments.

First Embodiment

Image Forming Apparatus

Figure 1:
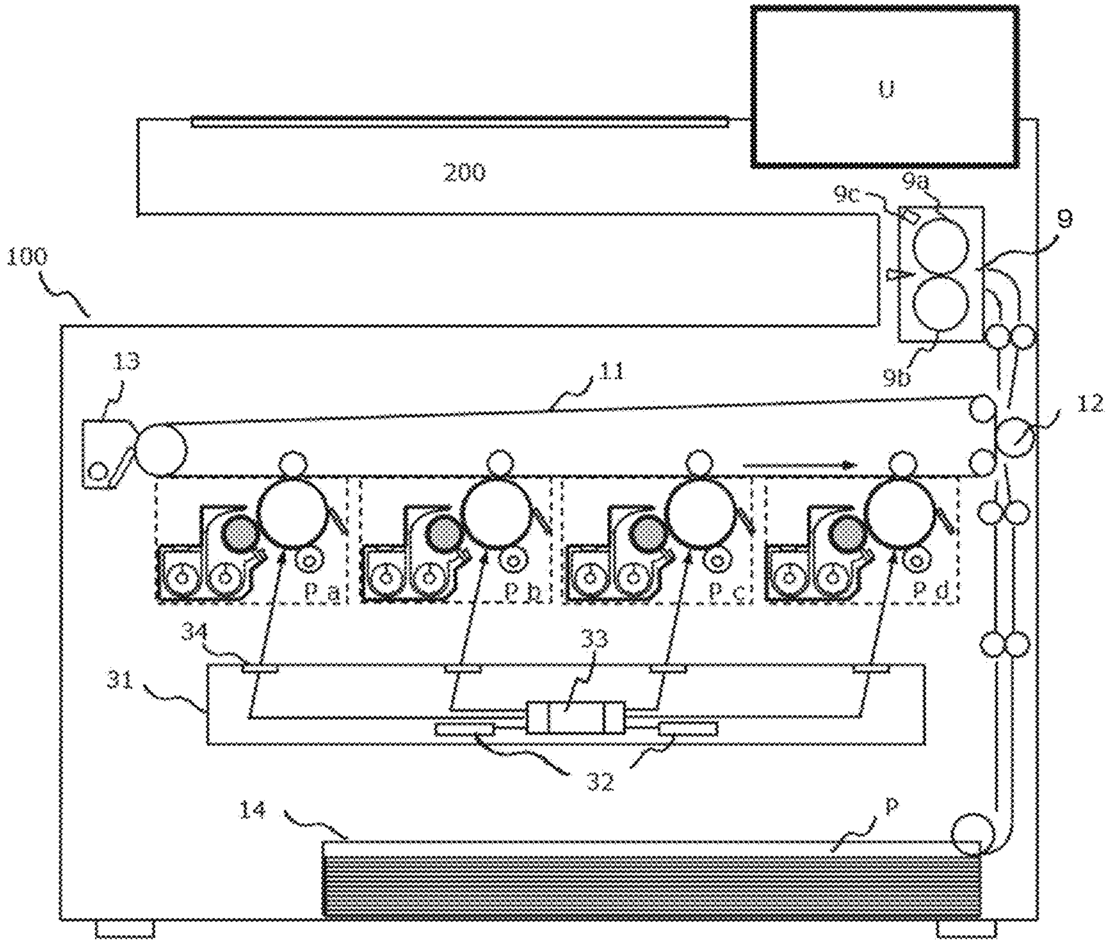
FIG. 1 is a schematic configuration view of a color image forming apparatus.

FIG. 1 is a schematical configuration view of a color image forming apparatus 100 of an intermediate transfer system according to the present embodiment. The image forming apparatus 100 according to the first embodiment is an electrophotographic type laser beam multifunction machine employing a contact charging system and a two-component contact developing system. As illustrated in FIG. 1 in the image forming apparatus 100, four image forming stations Pa, Pb, Pc, and Pd, each of which operates as an image former, are arranged in series in the image sending direction.

Figure 2:
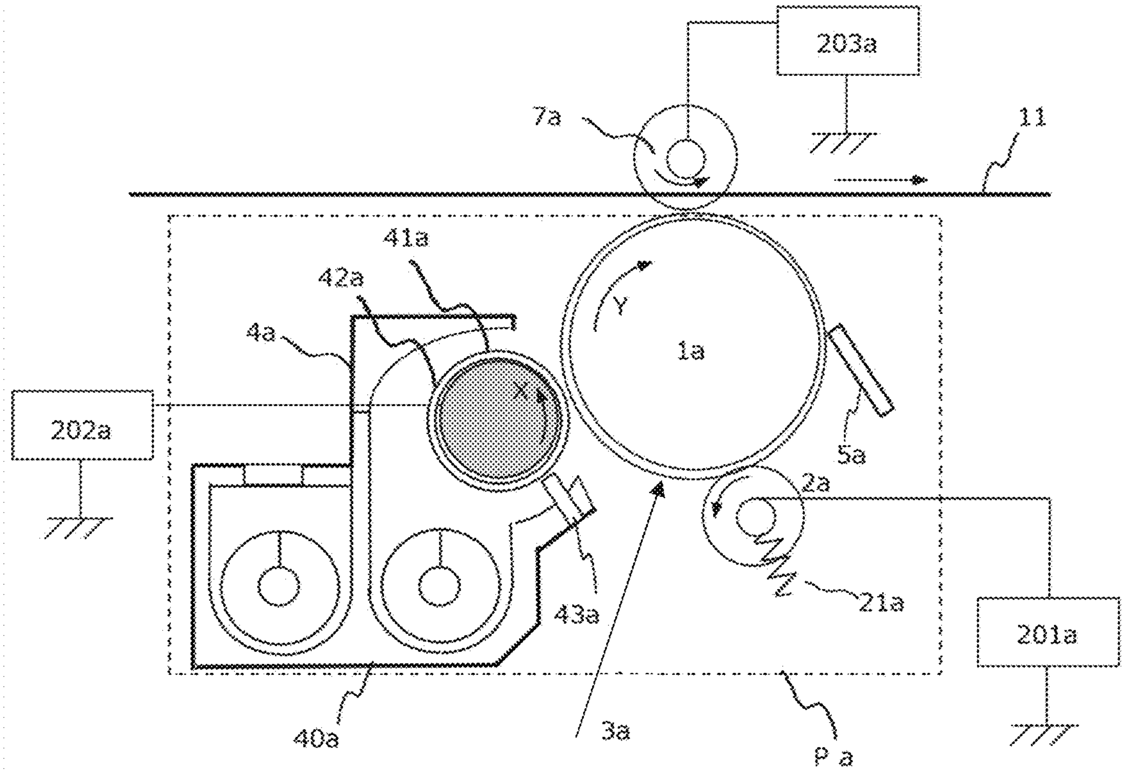
FIG. 2 is a schematic configuration view of an image forming station.

FIG. 2 illustrates a sectional view of the image forming station Pa. Since four image forming stations Pa, Pb, Pc, and Pd have similar configurations, for simplicity, only the image forming station Pa is illustrated in FIG. 2. Each of the subscripts a, b, c, and d corresponds to yellow, magenta, cyanogen, and black, respectively. Hereinafter, as to components common to each color, the subscript may be omitted as appropriate. As illustrated in FIG. 2, the image forming station Pa includes a photosensitive drum 1*a* as a photosensitive member, a charging roller 2*a* as a charging unit, a laser scanner 3*a* as an exposure unit, a developing device 4*a*, a cleaning device 5*a*, and a transfer roller 7*a* as a primary transfer apparatus. Further, the intermediate transfer belt 11, which serves as an intermediate transfer member, is provided to be movable in the direction of the arrow such that it can pass between the transfer roller 7*a* and the photosensitive drum 1*a* of the image forming station Pa. The above configuration also applies to the intermediate transfer belt 11, transfer roller 7*b*, 7*c*, and 7*d*, and photosensitive drums 1*b*, 1*c*, and 1*d* of the image forming station Pb, Pc, and Pd.

As illustrated in FIG. 1, the scanner unit 31, in which a light source apparatus 32, a polygon mirror 33, and an exposure window 34 are provided, is arranged at a position lower than the image forming apparatus 100. The polygon mirror rotates to cause scanning by a laser light emitted from the light source apparatus 32. The light fluxes of scanning light are deflected by a plurality of reflection mirrors, and are collected by an fθ lens and exposed on a generating line of each of the photosensitive drums 1*a*, 1*b*, 1*c*, and 1*d*. As a result, electrostatic latent images corresponding to the image signals are formed on the photosensitive drums 1*a*, 1*b*, 1*c*, and 1*d*, respectively.

In FIG. 2, the developing device 4*a* of the image forming station Pa is loaded with a predetermined amount of two-component developer acquired by mixing yellow non-magnetic toner and magnetic carriers at a predetermined mixture ratio. The developing device 4*a* develops the electrostatic latent image on the photosensitive drum 1*a* with the toner of yellow to form a toner image, and the toner images are primarily transferred onto the intermediate transfer belt 11. The above applies to the other image forming stations Pb-Pd; therefore, the image forming station Pa is mainly explained hereinafter. Each of the developing devices 4*b*, 4*c*, and 4*d* of the image forming stations Pb, Pc, and Pd is loaded with a predetermined amount of two-component developer acquired by mixing magnetic carrier and corresponding one of magenta non-magnetic toner, cyan non-magnetic toner, and black non-magnetic toner at a predetermined mixture ratio. Each of the developing devices 4*b*, 4*c*, and 4*d* develops the latent image on the photosensitive drums 1*b*, 1*c*, and 1*d* with the toner of each color one by one, respectively, to form a toner image, and the toner images are primarily transferred onto the intermediate transfer belt 11.

Returning to FIG. 1, the recording material P, such as a sheet stored in a sheet feeding cassette 14, is conveyed to a secondary transfer apparatus 12. The toner image carried on the intermediate transfer belt 11 is secondarily transferred onto the recording material P, and after the toner image is fixed by heating and pressurization by the fixing unit 9, the toner image is discharged outside the image forming apparatus 100 as a recorded image. Moreover, downstream from the secondary transfer position in the traveling direction of the intermediate transfer belt, a cleaning blade 13 is arranged to contact constantly the intermediate transfer belt to clean off secondary transfer residual toner and fogged toner adhered to a surface of the intermediate transfer belt. Here, “fogged toner” is a generic term for the toner adhering to a non-image forming area of the photosensitive drums 1*a*, 1*b*, 1*c*, and 1*d*. The fixing unit 9 is a heat roller type fixing device having a fixing roller 9*a* and a pressing roller 9*b*, and a halogen lamp heater as a heat source is arranged, in a non-rotating state, inside the fixing roller 9*a*. On the surface of the fixing roller 9*a*, a thermistor 9*c* that senses temperature by contact-type temperature sensing is arranged. A CPU 301, which is described later, controls a power supply to a halogen lamp heater as a controller according to a detected temperature of a thermistor 57. By this electric power supply control, the CPU 301 performs a temperature control so that a surface temperature of the fixing roller 9*a* is maintained to a predetermined temperature (for example, 180° C.).

On the other hand, as illustrated in FIG. 2, the primary transfer residual toner on the photosensitive drum 1*a* of the image forming station Pa and the like are removed from the photosensitive drum 1*a* by the cleaning device 5*a*. This applies to the other image forming stations Pb, Pc, and Pd. Returning to FIG. 1, a document scanner 200 which reads a document and the like is provided at the upper portion of the image forming apparatus 100. Further, an operation unit U, which is to receive operation by a user, is provided at an upper portion of the image forming apparatus 100, for example, the operation unit U consists of a liquid crystal touch panel, etc.

In the first embodiment, the image forming apparatus 100 performs image forming at a process speed of 200 mm/sec. First, the image forming apparatus 100 performs a charging process for a surface of the photosensitive drum 1*a* uniformly by applying a high pressure to the charging roller 2*a* illustrated in FIG. 2. The charging roller 2*a* has both end portions of a core metal rotatably held by bearing members (not illustrated), respectively. Further, the charging roller 2*a* is urged toward the photosensitive drum 1*a* by a pressure spring 21, thus, it is pressed against and in contact, with a predetermined pressure force, with the surface of the photosensitive drum 1*a*. Therefore, the charging roller 2*a* is driven to rotate according to the rotation of the photosensitive drum 101*a*. The core metal of the charging roller 2*a* is applied with a charging bias voltage of a predetermined condition by a high-voltage power supply 201*a*. As a result, the surface of the rotating photosensitive drum 1*a* is subjected to contact charging processing to achieve a predetermined polarity and potential.

In the first embodiment, the charging bias voltage to be applied to the charging roller 2*a* is an oscillation voltage acquired by superimposing a DC voltage (Vd) and an AC voltage (Vac). Specifically, the charging bias voltage is an oscillation voltage acquired by superimposing a DC voltage of −600 V and a sine-wave AC voltage having a frequency of 1.3 kHz and a peak-to-peak voltage Vpp of 1.5 kV. With the charging bias voltage, the surface of the photosensitive drum 1*a* is uniformly charged to −600 V (DC voltage Vd, which is a dark potential) which is the same as the DC voltage applied to the charging roller 2*a*. The image forming apparatus 100 forms an electrostatic latent image on the surface of the charged photosensitive drum 1*a* with a laser scanner 3*a*. In the first embodiment, the laser scanner 3*a* is a laser beam scanner having a semiconductor laser.

Then, the image forming apparatus 100 supplies toner by the developing device 4*a* according to the electrostatic latent image on the photosensitive drum 1*a* to form a toner image (developed image). In the first embodiment, a two-component contact development system, in which developing is performed with a magnetic brush being in contact with the photosensitive drum 1*a*, is used in the developing device 4*a*. The magnetic brush includes a two-component developer which consists of non-magnetic toner and a magnetic carrier. It is noted that non-magnetic toner with negative polarity is used in the first embodiment. The developing device 4*a* includes a developing container 40*a* and a non-magnetic developing sleeve 41*a* as a developer carrier. The developing sleeve 41*a* is driven to rotate at a predetermined speed in the rotation direction X in FIG. 2 by a drive mechanism unit (not illustrated) in an outer circumference of a magnet roller 42*a*. A developer layer thickness regulation blade 43*a* is provided to form a thin layer of the developer on the surface of the developing sleeve 41*a*.

The developing sleeve 41*a* is arranged, with a portion of its outer surface exposed to an outside of the developing device 4*a*, in close proximity to and opposite the photosensitive drum 1*a* with maintaining the closest distance (S-D gap) between the developing sleeve 41*a* and the photosensitive drum 1*a* at 260 μm. An area where this photosensitive drum 1*a* and the developing sleeve 41*a* face each other constitutes a developing portion. Further, in the developing portion, the developing sleeve 41*a* is driven to rotate in the rotation direction X, which is opposite to a rotation direction Y of the photosensitive drum 1*a*. The developing sleeve 41*a* is applied with a predetermined developing bias voltage from a high-voltage power supply 202*a*. In the first embodiment, a developing bias voltage is an oscillation voltage acquired by superimposing a DC voltage (Vdc) and an AC voltage (Vac). Specifically, it is an oscillation voltage acquired by superimposing a DC voltage of −450 V and a square-wave AC voltage having a frequency of 8.0 kHz and a peak-to-peak voltage Vpp of 1.8 kV. With an electric field of the electrostatic latent image formed on the surface of the photosensitive drum 1*a* and the developing bias, the electrostatic latent image is subjected to reversal development.

The image forming apparatus 100 performs, by the transfer roller 7*a*, primary transfer of the developer image formed on the drum 1*a* to the intermediate transfer belt 11. The transfer roller 7*a* is pressed against with a predetermined pressure force and in contact with the photosensitive drum 1*a*. For the transfer roller 7*a*, a transfer bias with a positive polarity, which is the reverse polarity of the charging polarity of the toner, +1 kV in the first embodiment, is applied from the high-voltage power supply 202*a*, and the toner is primarily transferred onto the intermediate transfer belt 11.

Document Scanner

Figure 3:
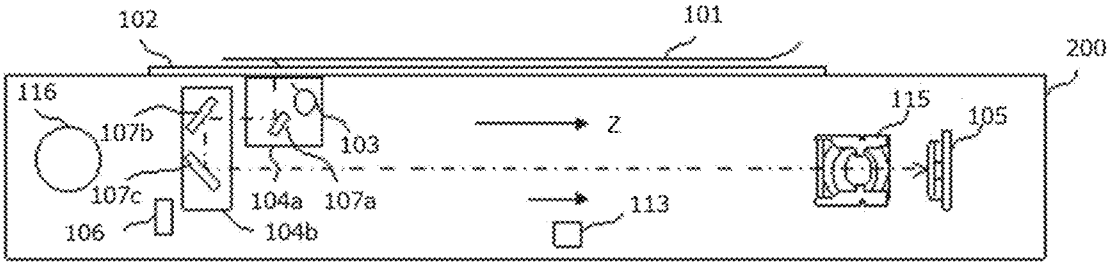
FIG. 3 is a configuration view of a document scanner.

FIG. 3 is a schematic view illustrating a configuration of the document scanner 200. The document scanner 200 includes, in its housing, a first mirror unit 104*a*, a second mirror unit 104*b*, an image sensor 105, a lens 115, a drive motor 116, a document size detection sensor 113, and a home position sensor 106. The first mirror unit 104*a* includes a document lighting lamp 103 and a first mirror 107*a*. The second mirror unit 104*b* includes a second mirror 107*b* and a third mirror 107*c*. The first mirror unit 104*a* and the second mirror unit 104*b* are driven by the drive motor 116 movably in a direction Z by the drive motor 116.

At the time of document reading, the first mirror unit 104*a* and the second mirror unit 104*b* move, by the rotation of the drive motor 116, to a home position at which a home position sensor 106 is provided. On the platen glass 102, a document 101 of one sheet is fixed, with its reading surface facing the platen glass 102 side, by a pressure plate and an ADF unit (not illustrated). The document scanner 200 turns on a document lighting lamp 103 to irradiate the reading surface of the document 101. The first mirror unit 104*a* and the second mirror unit 104*b* deflect and guide, while moving in the direction Z, by the first mirror 107*a*, the second mirror 107*b*, and the third mirror 107*c*, an image light from the document 101 to the lens 115. The lens 115 focuses the image light on a light receiving surface of the image sensor 105. The image sensor 105 converts the image light into an electric signal.

Block Diagram

Figure 4:
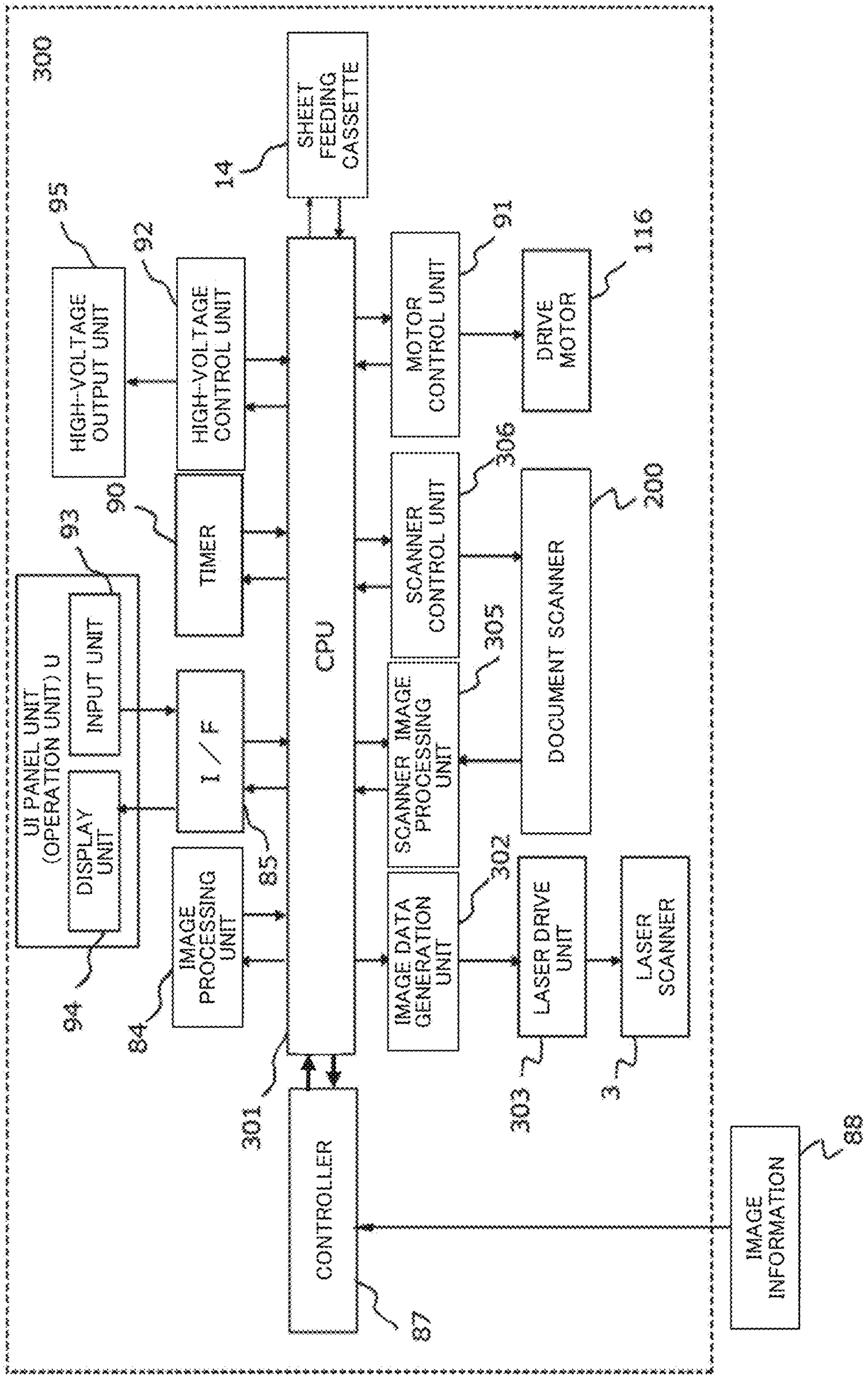
FIG. 4 is a functional block diagram of an image forming apparatus.

FIG. 4 is a schematic configuration diagram of the image forming apparatus 100. The image forming apparatus 100 includes a central processing unit (CPU) 301, and a random access memory (RAM) and read only memory (ROM) (not illustrated). To the CPU 301, an image data generation unit 302, a scanner image processing unit 305, a scanner control unit 306, a motor control unit 91, a controller 87, an image processing unit 84, an I/F unit 85, a timer 90, a high-voltage control unit 92, and the sheet feeding cassette 14. The CPU 301 executes a computer program stored in the ROM 307 to control an entire operation of the image forming apparatus 100 to execute processing of generating various command signals and computation processing in order to operate various sensors, motors, and the like of the image forming apparatus 100 according to an electrophotographic process. A work area that is used when the CPU 301 executes a process is provided by a RAM. A high-voltage control unit 92 is connected to a high-voltage output unit 95. Specifically, the high-voltage output unit 95 includes high-voltage power supplies 201*a*-201*d*, 202*a*-202*d*, and 203*a*-203*d* and these are controlled by the high-voltage control unit 92.

The CPU 301 has a built-in memory for storing data. The image data generation unit 302 is controlled by the CPU 301 so as to convert various types of image data into signals for laser control and transmit control signals to the laser drive unit 303 provided for each color of yellow, magenta, cyan, and black. The image data generation unit 302 also generates a toner pattern for various adjustments. The laser drive unit 303 is provided for each color, and drives a laser element of the laser scanner 3 for each color based on the signals transmitted from the image data generation unit 302. The laser drive unit 303 has a function for controlling lighting and a light amount of laser.

The scanner control unit 306 controls ON/OFF of the document lighting lamp 103 provided in the document scanner 200 and driving of the drive motor 116 according to a command signal from the CPU 301. The scanner image processing unit 305 acquires an electric signal from the image sensor 105 provided in the document scanner 200 and generates an image signal to send it to the CPU 301. The motor control unit 91 is connected to the drive motor 116 and various drive motors (not illustrated) and controlled by the CPU 301 so as to control drive timings and drive speeds. The high-voltage control unit 92 controls output of a bias voltage required for an image forming process, such as the charging bias voltage, the developing bias voltage, the transfer bias voltage, and the like.

The CPU 301 is electrically connected to the sheet feeding cassette 14 via the I/F (interface) 85 and the timer 90, and further connected to an operation unit (UI panel unit) U via the I/F unit 85. The CPU 301 performs image forming using the recording material P as a recording medium stored in the sheet feeding cassette 14. Further, the operation unit U has an input unit 93 and a display unit 94 to receive operation by a user, and includes a liquid crystal touch panel. Various settings, instructions, and the like input through the input unit 93 are input to the CPU 301 via the I/F unit 85.

The CPU 301 displays an input screen and the like on the display unit 94 via the I/F unit 85. The I/F unit 85 may be configured to perform communication control to/from an external device such as a personal computer, in place of the operation unit U. In this case, various settings, instructions, and the like are input from the personal computer, and an input screen or the like is displayed on the personal computer. Further, the CPU 301 controls the operation of the sheet feeding cassette 14 so as to control the feeding of the recording material P stored in the sheet feeding cassette 14. The CPU 301 can determine, based on various sensors provided on the sheet feeding cassette 14, whether or not the recording material P is stored in the sheet feeding cassette 14 and whether or not the sheet feeding cassette 60 is mounted on the image forming apparatus 100 and the like.

The CPU 301 is also electrically connected to the controller 87 and the image processing unit 84. The image information 88 is provided from an external apparatus or the like, and is sent to the CPU 301 via the controller 87. The CPU 301 can form an image by processing the acquired image information 88 in the image processing unit 84.

Density-Line Width Correction Control

Hereinafter, a density-line width correction control is explained. In the density-line width correction control, a test chart including a plurality of test images formed under different image forming conditions are formed, then, the image forming condition is determined such that an image having a predetermined density and a predetermined line width is acquired based on a reading result of the test chart. The test chart is an adjustment image for the image forming condition. The image forming condition includes a plurality of conditions that affects density and line width, and have values which can be changed. In the first embodiment to the third embodiment, the image forming condition includes a potential condition of the photosensitive drum 1 as a first condition, and a light amount condition of a semiconductor laser of the laser scanner 3, which is an exposure unit as a second condition.

Figure 5:
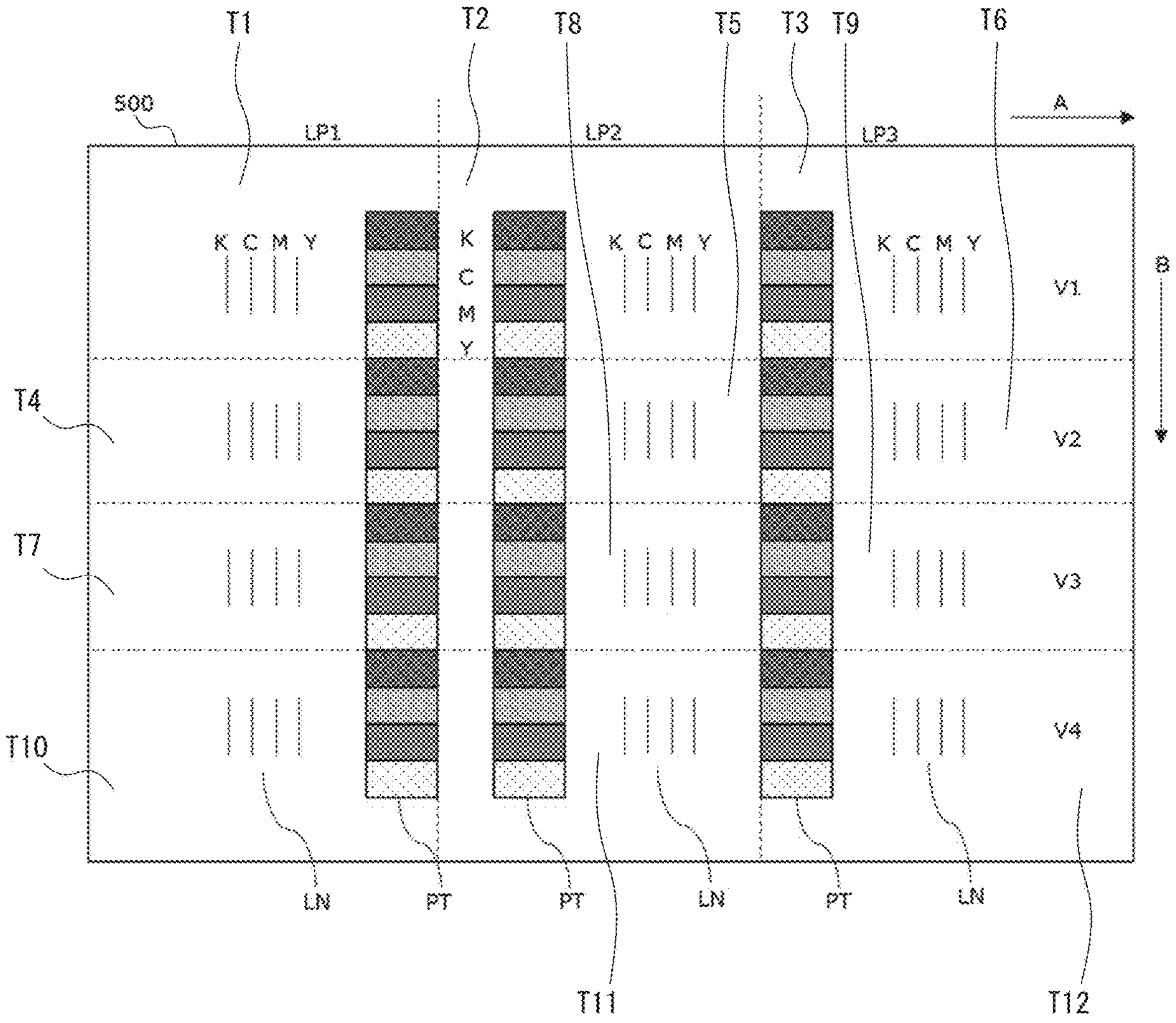
FIG. 5 is an exemplary diagram of a test chart.

FIG. 5 illustrates an example of a test chart of the density-line width correction control in the first embodiment. In the test chart 500, for each color of yellow (Y), magenta (M), cyan (C), and black (K), a patch image PT and a line image LN, which are formed by 100% density signal are included, respectively. The patch image PT is a patch with a size of 8 mm in a longitudinal direction and 16 mm in a lateral direction. In each embodiment, a conveyance direction of the recording material P is described as "longitudinal direction", and a direction perpendicular to the conveyance direction of the recording material P is described as "lateral direction". As for the line width of a line of the test chart 500, it is desirable to properly form the line width ranging from a line width of two lines at 600 dpi to a line width of two lines at 600 dpi.

For example, to prevent breakage or faintness of the fine line portion of fonts such as Mincho typeface and Times New Roman typeface, and prevent blurring and the like of fonts such as Gothic typeface and Arial typeface, it is desirable to properly form the line width as described above.

Therefore, the line image LN has the line width of two lines at 600 dpi as the predetermined line width, and has a length of 10 mm. On the other hand, as to the optical density of the patch image PT, as a predetermined density, a target of the optical density of a 100% patch was set to 1.5.

The test chart 500 is formed with changing image conditions. Specifically, the test chart 500 is formed with changing a laser light amount (light amount condition) of the semiconductor laser, which is the exposure unit, and changing conditions of potential (potential condition) of the photosensitive drums 1*a*, 1*b*, 1*c*, and 1*d*. In FIG. 5, the main scanning direction of the laser is indicated by an arrow A, and the line image LN and the patch image PT are formed in the upper stream side (left-hand side in FIG. 5) with a condition of laser light amount LP1. Then, the line image LN and the patch image PT are formed with conditions of laser light amounts LP2 and LP3. In the first embodiment, as to the laser light amount LP1, a surface light volume at the photosensitive drums 1*a*, 1*b*, 1*c*, and 1*d* is 0.16 $\mu J/cm^2$, the laser light amount LP2 is 0.24 $\mu J/cm^2$, and the laser light amount LP3 is 0.32 $\mu J/cm^2$.

In FIG. 5, the conveyance direction of a sheet is indicated by the arrow B and, in the upper stream side (above) of the conveyance direction, a high-voltage of a potential condition V1 is applied from high-voltage power supplies 201*a*-201*d*, which output charging high-voltage. Further, voltages from the high-voltage power supplies 202*a*-202*d*, which output a developing high-voltage, and the high-voltage power supplies 203*a*-203*d*, which output a primary transfer high-voltage, are also applied. Then, the high-voltages of the potential conditions V2, V3, and V4 are applied to form the patch image PT and the line image LN on the recording material P.

For each potential condition V1-V4, in the charging high-voltage and the developing high-voltage, an oscillating voltage acquired by superimposing a DC voltage and an AC voltage is applied, and, in the primary transfer high-voltage, the DC voltage is applied. As to the DC voltage, under the potential condition V1, the DC voltage in the oscillating voltage of the charging high-voltage is −550V, and the DC voltage in the oscillating voltage of the developing high-voltage is −400V. Further, the DC voltage of +1050V is applied to the primary transfer high-voltage. Under the potential condition V2, the DC voltage in the oscillating voltage of the charging high-voltage is −600V, and the DC voltage in the oscillating voltage of the developing high-voltage is −450V. Further, the DC voltage of +1000V is applied to the primary transfer high-voltage. Under the potential condition V3, the DC voltage in the oscillating voltage of the charging high-voltage is −650V, and the DC voltage in the oscillating voltage of the developing high-voltage is −500V. Further, the DC voltage of +950V is applied to the primary transfer high-voltage. Under the potential condition V4, the DC voltage in the oscillating voltage of the charging high-voltage is −700V, and the DC voltage in the oscillating voltage of the developing high-voltage is −550V. Further, the DC voltage of +900V is applied to the primary transfer high-voltage. The switching of these exposure conditions and the potential conditions is changed based on the timer 90 of the image forming apparatus 100 to thereby perform image forming of the test chart 500.

On the other hand, in each of the potential conditions V1-V4, as the AC voltage of the charging high-voltage, a sine-wave AC voltage having a frequency of 1.3 kHz and a peak-to-peak voltage Vpp of 1.5 kV is superimposed on the above DC current. Further, as the AC voltage of the charging high-voltage, a square-wave AC voltage having a frequency of 8.0 kHz and a peak-to-peak voltage Vpp of 1.8 kV is superimposed on the above DC current. The switching of these exposure conditions and the potential conditions is changed based on the timer 90 of the image forming apparatus 100 to thereby perform image forming of the test chart 500.

In FIG. 5, the test image is formed for each of 3×4=12 types of combination of three types of the laser light amounts LP1-LP3 and four types of the potential conditions. The test images include four patch images PT, corresponding to four colors of Y, M, C, and K, and four line images LN, corresponding to four colors of Y, M, C, and K, respectively. For illustrative purposes, a test image formed under the potential condition V1 and a laser light amount LP1 is represented by T1, a test image formed under the potential condition V1 and a laser light amount LP2 is represented by T2, and a test image formed under the potential condition V1 and a laser light amount LP3 is represented by T3. Similarly, under the potential condition V2, test images formed under laser light amounts LP1, LP2, and LP3 are represented by T4, T5, and T6, respectively, and under the potential condition V3, test images formed under laser light amounts LP1, LP2, and LP3 are represented by T7, T8, and T9, respectively. Further, under the potential condition V3, test images formed under laser light amounts LP1, LP2, and LP3 are represented by T10, T11, and T12, respectively. These test images T1-T12 differ from each other at least in one of the light amount condition (laser light amounts LP1-LP3) and potential condition (V1-V4). That is, a plurality of the test images T1-T12 are formed under respective different image forming conditions.

Figure 6:
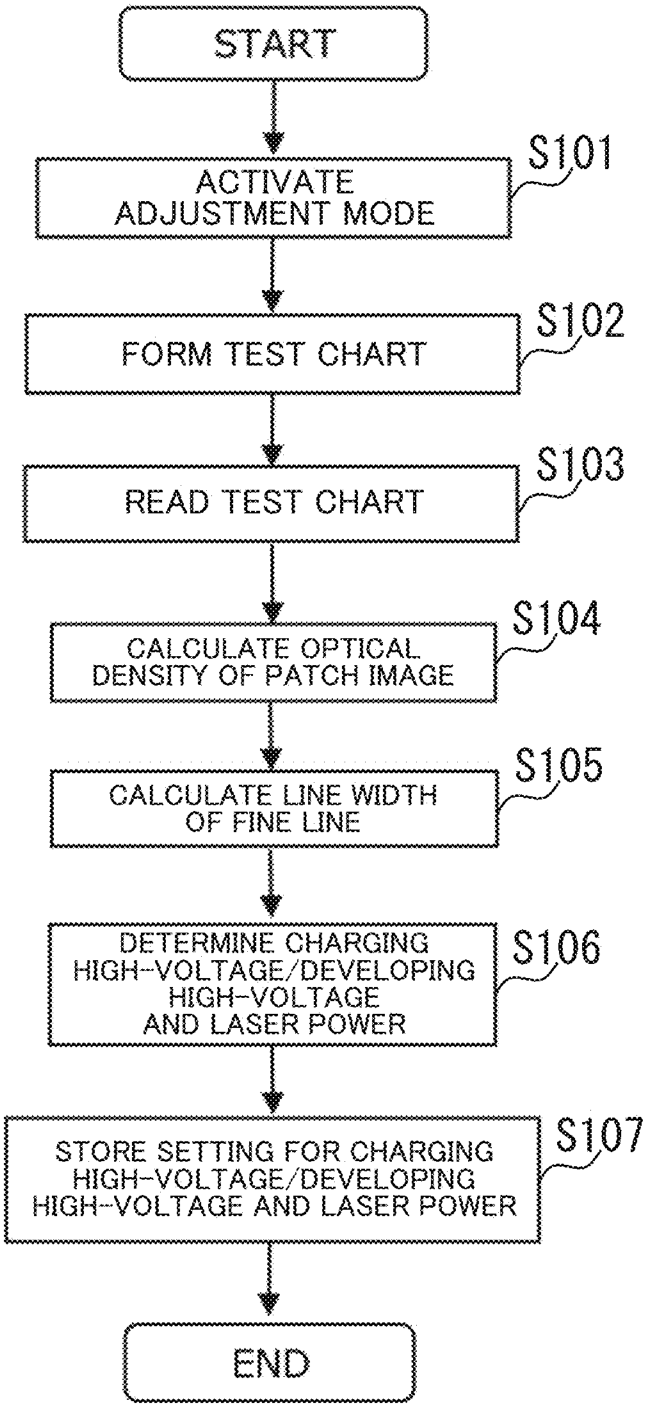
FIG. 6 is a flow chart illustrating a density-line width correction control.
Figure 7A:
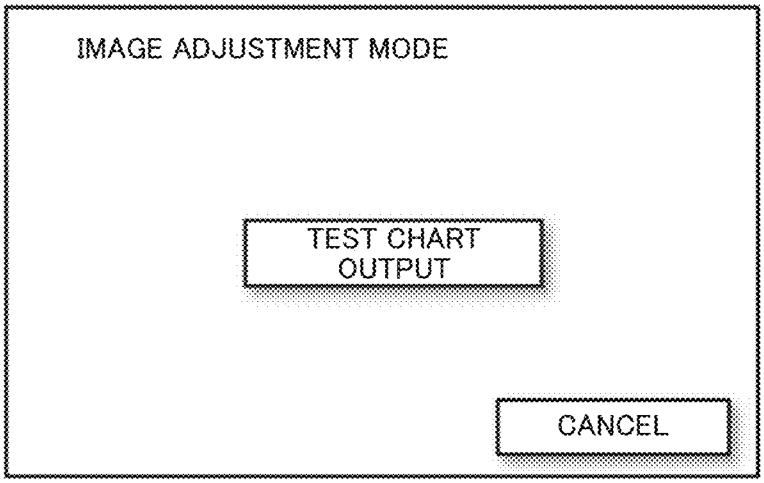
FIG. 7A, FIG. 7B, and FIG. 7C are explanatory views of a display screen of an operation unit.
Figure 7B:
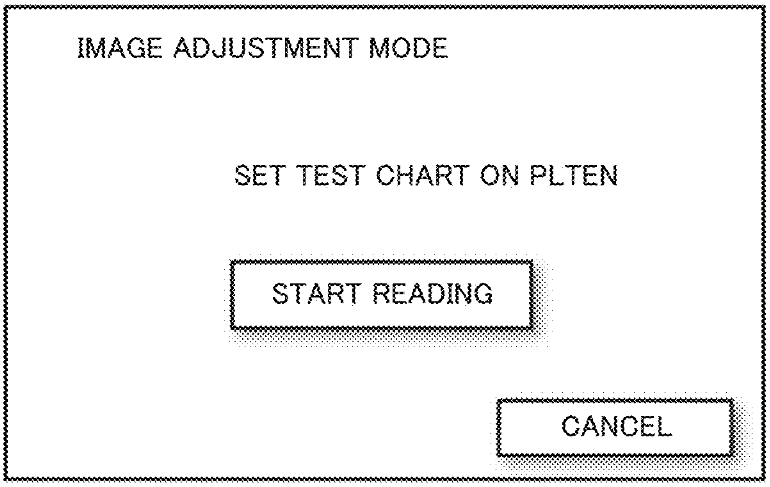
Figure 7C:
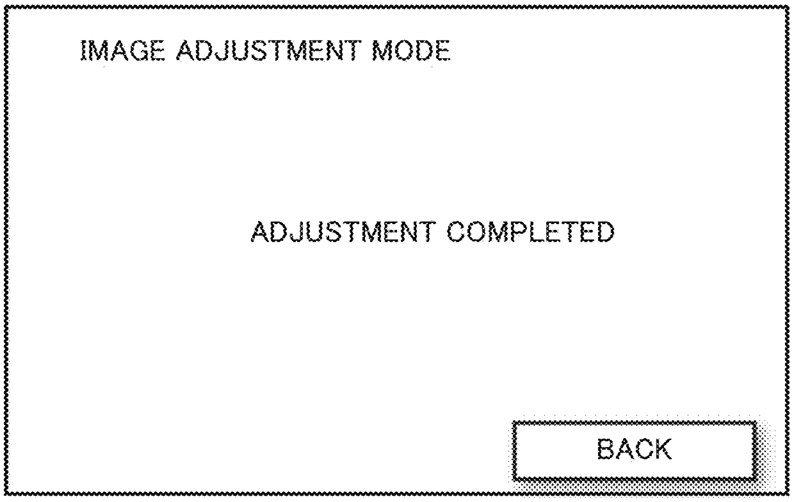

FIG. 6 is a flow chart illustrating a density-line width correction control process, and each process is executed by the CPU 301, unless otherwise noted. FIG. 7A-FIG. 7C are explanatory diagrams of a display screen of the operation unit U at the time of density-line width correction control. The CPU 301 activates adjustment mode in a case where calibration is instructed, via the input unit 93 of the operation unit U, from a user or a service worker or the like (hereinafter referred to as "user"). Then, as illustrated in FIG. 7A, a screen containing a "test chart output" button and a "cancel" button is displayed on the operation unit U (Step S101). In a case where the user selects a "cancel" button from this input screen, the CPU 301 ends the density-line width correction control.

The user pushes the "test chart output" button to select recording paper to be subjected to adjustment of the density and the line width. Thereby the CPU 301 changes the exposure condition and the potential condition to form and output the test chart 500 which includes the test images T1-T12 each formed under different conditions (Step S102). The CPU 301 displays a screen including a "start reading" button and a "cancel" button, and an instruction to the user "set test chart on platen" on the input unit 93 of the operation unit U, as illustrated in FIG. 7B. In a case where the user selects a "cancel" button from this input screen, the CPU 301 ends the density-line width correction control process.

After the user has set the output test chart 500 on a platen and pressed the "start reading" button, the CPU 301 reads the test chart 500 in a predetermined resolution by the document scanner 200 (Step S103). In the first embodiment, the reading resolution of the document scanner 200 is set to 600 dpi, and the CPU 301 sends the RGB signal, which is read under a condition of a bit depth of 8 bit, to the scanner image processing unit 305. The resolutions, hit depth, etc., can be suitably set as desired.

In the scanning image, for a total of 20 patch images PT (5 for each of yellow, magenta, cyan, and black), the CPU 301 converts an RGB signal value into optical density, using the RGB signal of the position and LUTid (X), which is previously prepared. Thereby the optical density of the patch image PT is calculated (Step S104). Then, the CPU 301 calculates line width, for the yellow, magenta, cyan, and black in a scanning image, from the RGB signal value of the position of the line images LN1 and LN2 of each of eight colors (Step S105).

There is no restriction for a method for measuring the line width for black, and any measuring methods can be used as desired. For example, a method of measuring a line width is specified as ISO24790 by International Standardization Organization (ISO), and it is also possible to use this method. Further, when calculating the line width of cyan, an R signal of the RGB signal value of the scanning image is referred to, when calculating the line width of magenta, a G signal of the RGB signal value of the scanning image is referred to and when calculating the line width of yellow, a B signal of the RGB signal value is referred to, respectively, and the line width is measured as in the line of black. Also, there is no restriction for a method for measuring the line width for each of yellow, magenta, and cyan, and any measuring methods can be used as desired.

The CPU 301 determines a charging high-voltage/developing high-voltage and a laser power to determine the potential condition and the exposure condition so that each of the optical density and the line width becomes a desired value, respectively (Step S106). Then, the CPU 301 stores the charging high-voltage/developing high-voltage, each of which is a potential condition, and the laser power, which is the exposure condition, in the memory for storing data provided inside the CPU 301 (Step S107). Then, the CPU 301 displays a screen including a message "adjustment completed", which is illustrated in FIG. 7C, on the display unit 94 of the operation unit U to thereby end the adjustment control.

Figure 8:
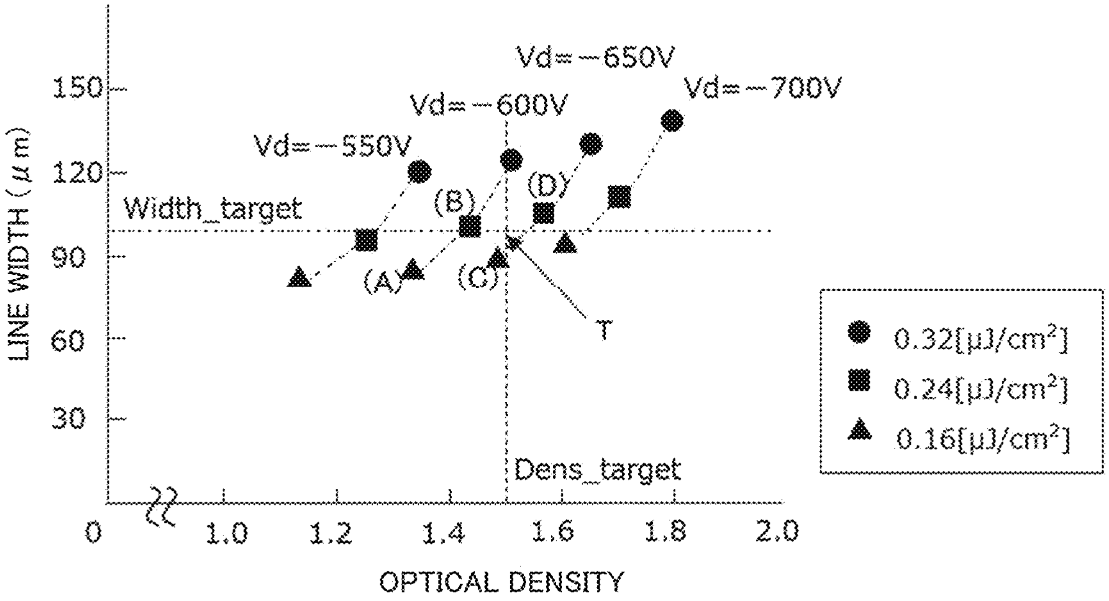
FIG. 8 is a graph illustrating line widths of line images and optical densities of patch images in a case where an exposure condition and a potential condition are changed.

Then, a description is provided with regard to control in the image forming apparatus 100 of the first embodiment with reference to Table 1, Table 2, and FIG. 8.

TABLE 1

| PATCH DENSITY | | EXPOSURE CONDITION (DRUM SURFACE LIGHT AMOUNT) LP1 0.16 (μJ/Cm²) | LP2 0.24 (μJ/Cm²) | LP3 0.32 (μJ/Cm²) |
|---|---|---|---|---|
| POTENTIAL | V1: −550 V | 1.13 | 1.25 | 1.34 |
| CONDITION | V2: −600 V | 1.33 | 1.43 | 1.52 |
| (CHARGING | V3: −650 V | 1.48 | 1.56 | 1.65 |
| DC VOLTAGE) | V4: −700 V | 1.60 | 1.70 | 1.79 |

TABLE 2

| PATCH DENSITY (μJ/cm²) | | EXPOSURE CONDITION (DRUM SURFACE LIGHT AMOUNT) LP1 0.16 (μJ/Cm²) | LP2 0.24 (μJ/Cm²) | LP3 0.32 (μJ/Cm²) |
|---|---|---|---|---|
| POTENTIAL | V1: −550 V | 82(μm) | 98(μm) | 120(μm) |
| CONDITION | V2: −600 V | 86(μm) | 102(μm) | 125(μm) |
| (CHARGING | V3: −650 V | 90(μm) | 107(μm) | 132(μm) |
| DC VOLTAGE) | V4: −700 V | 95(μm) | 112(μm) | 139(μm) |

Table 1 is a table illustrating the optical density of the patch image PT of black, and Table 1 is calculated, in S104 of FIG. 6, from the test chart 500 that is formed with changing the exposure condition and the potential condition. Table 2 is a table illustrative the line width of the line image LN of black, and Table 1 is calculated, in Step S105 of FIG. 6, from the test chart 500 that is formed with changing the exposure condition and the potential condition.

FIG. 8 is a graph illustrating line widths of line images LN and optical densities of patch images PT in a case where the exposure condition and the potential condition are changed. In FIG. 8, the lateral axis is optical density of the patch image PT, and the longitudinal axis is line width (μm). In the first embodiment, the target of the optical density of 100% patch is set as 1.5 (indicated by "Dens_target" in FIG. 8). The target (indicated by "Width_target" in FIG. 8) of the line width in two dots line of 600 dpi is set as 100 μm. Since the line image LN of the test chart 500 of the present embodiment is two dots line of 600 dpi, as to a target of line width, an ideal line width is 84.7 μm. However, since a line width tends to be thicker due to the influence of the reading resolution of a scanner and the like, in this embodiment, the target for the line width is set to 100 μm. The CPU 301 determines, targeting these settings, the image condition (in the first embodiment, the potential condition and the exposure condition) from the reading result of the test chart 500. Thus, the CPU operates as a determination unit to determine the image forming condition so as to acquire a predetermined width and a predetermined density from the reading result of the test chart 500.

Table 1 illustrates, as the exposure condition for forming the test chart 500 illustrated in FIG. 5, drum surface light amounts of the laser light amounts LP1-LP3. In Table 1, the patch densities for potential conditions V1-V4 are described. The laser light amounts LP1, LP2, and LP3 indicate that the drum surface light amounts are 0.16 μJ/cm², 0.24 μJ/cm², and 0.32 μJ/cm², respectively. Further, as to the potential conditions V1, V2, V3, and V4, DC voltage Vd in the charging high-voltage is −550V, −600V, −650V, and −700V, respectively. For example, in a case where the drum surface light amount is LP1 (0.16 μJ/cm²) and the potential condition is V2 (−600V), the patch density is 1.33. This corresponds to the optical density of the patch image PT illustrated in the lateral axis in FIG. 8 being 1.33.

In Table 2, instead of the patch density of Table 1, the line width (μm) is illustrated, though the exposure condition and the potential condition are the same as Table 1. For example, in a case where the laser light amount is LP (0.16 μJ/cm²) and the potential condition is V2 (−600V), the line width is 86 μm. This corresponds to the line width illustrated in the longitudinal axis in FIG. 8 is 86 μm.

Thus, point A illustrated in FIG. 8 indicates that the laser light amount is LP1 and the potential condition is V2, the patch density is 1.33, and the line width is 86 μm. Point B indicates that the laser light amount is LP2 and the potential condition is V2, the patch density is 1.43, and the line width is 102 μm. Point C indicates that the laser light amount is LP1 and the potential condition is V3, the patch density is 1.48, and the line width is 90 μm. Point D indicates that the laser light amount is LP2 and the potential condition is V3, the patch density is 1.56, and the line width is 107 μm.

As illustrated in FIG. 8, the target T, which is a target in the image forming, having an optical density of 1.5 and line width of 100 μm is in a rectangle bounded by point (A) to point (S) in FIG. 8. The CPU 301 acquires the drum surface light amount and the potential condition corresponding to this point. The CPU 301 determines the value acquired as a result of the acquisition as a value for acquiring the width of 100 μm at the optical density of 1.5.

In the first embodiment, the CPU 301 calculates the potential condition and the exposure condition for acquiring the optical density of 1. 5 and the width of 100 μm by performing linear interpolation within the rectangle range hounded by points (A) to (D). As a result, the DC voltage of the charging high-voltage as the potential condition is calculated to be −630V, and the exposure condition is calculated to be 0.22 μJ/cm$^2$. From this result of calculation, the CPU 301 determines the potential condition to be −630V and the exposure condition to be 0.22 μJ/cm$^2$. Thereby, the potential condition and the exposure condition in the image forming station Pd of black are determined. It is noted that the DC voltage of development voltage is decided to be −480V, in consideration of a fog removal potential of 150V. Further, the primary transfer voltage is determined to be +970V. In this regard, the fog removal potential is a voltage applied to prevent adhering of toner on non-exposure parts, such as a margin area.

Similarly, for each of the image forming stations Pa, Pb, and Pc of cyan, magenta, and yellow, the potential condition and the exposure condition is determined such that optical density is 1. 5 and the width is 100 μm. These potential conditions and the exposure conditions are stored in a memory as image forming conditions, and are reflected in the potential conditions and the exposure conditions at the time of subsequent image forming. Thus, the image forming condition for acquiring both desired line width and a desired density can be determined. In the first embodiment and the second and third embodiments, which are described later, the potential condition and the exposure condition are acquired by linear interpolation. However, the method for determining the potential condition and the exposure condition is not restricted, and any method can be used.

The above density-line width correction control is performed periodically, such as when installing the image forming apparatus 100, when circumstances such as the temperature and the humidity of the setting position of the image forming apparatus 100 are changed, and when the number of supplied sheets of the image forming apparatus 100 has reached a predetermined number. Thus, regardless of individual difference or a condition of use of the image forming apparatus 100, the optical density at high density and the line width of a fine line can be properly adjusted, and an image of proper quality can be output from a low image ratio to a high image ratio.

Although an example of image forming apparatus 100 having a document scanner 200 has been described in the first embodiment, it is also possible to perform the density-line width control by scanning the test chart 500 using any separate document scanner which is separately provided to the image forming apparatus 100. In the first embodiment, the test chart 500 that contains the line image of two dots at 600 dpi was scanned at a resolution of 600 dpi to perform a density-line correction control. However, the density-line correction control can be performed by outputting the test chart 500 which contains the line image of 1 dot at 600 dpi, and scanning it using the document scanner 200 which can read image at a resolution of 1200 dpi or higher.

Second Embodiment

Figure 9:
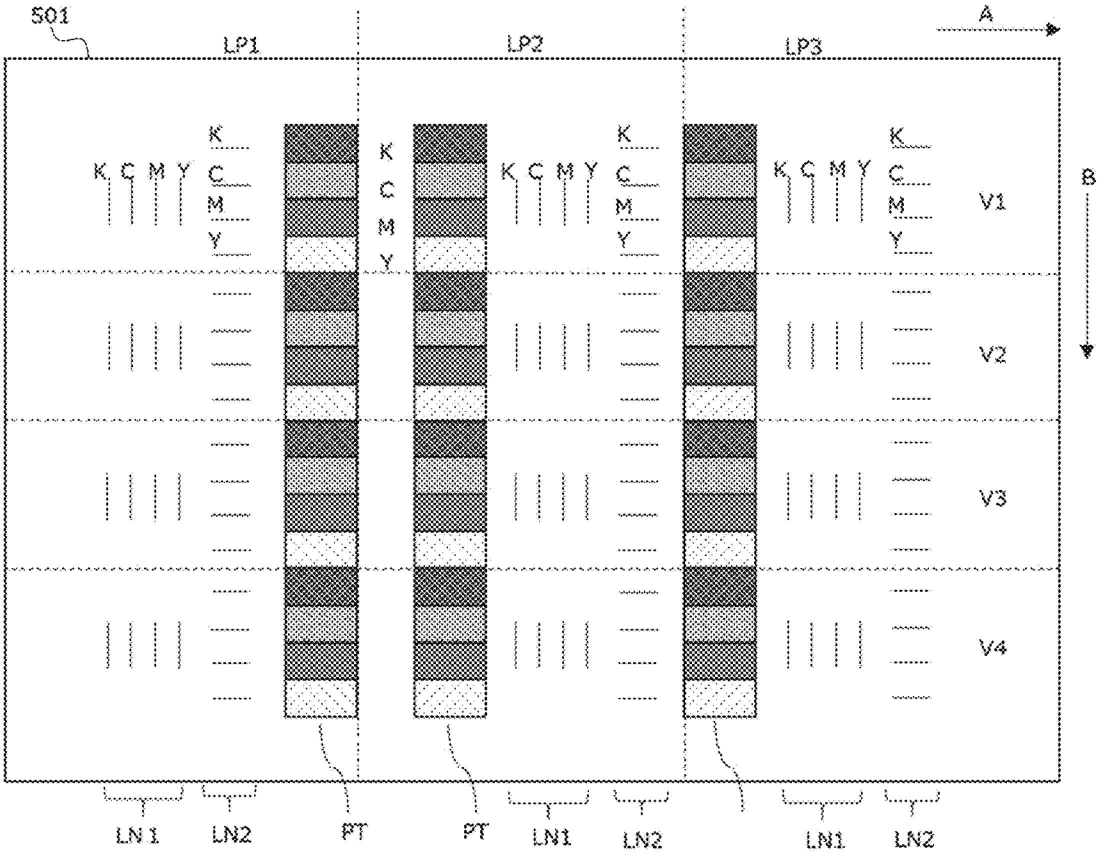
FIG. 9 is an explanatory diagram of a test chart in the second embodiment.
Figure 10:
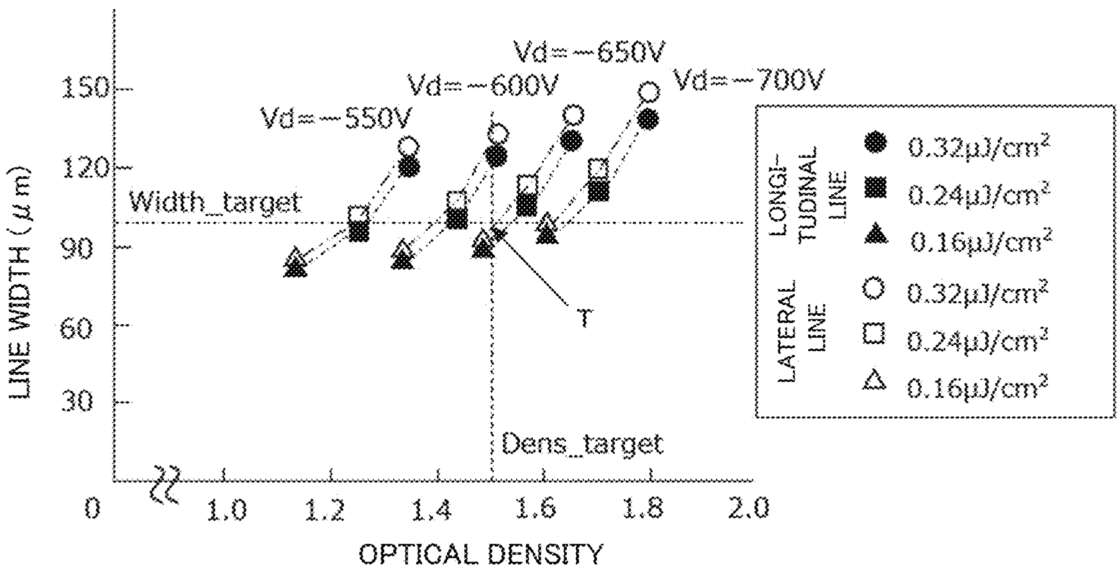
FIG. 10 is a graph illustrating line widths of line images and optical densities of patch images in a case where an exposure condition and a potential condition are changed in the second embodiment.

With reference to FIG. 9 and FIG. 10, the second embodiment will be described below. In the first embodiment, as illustrated in FIG. 5, the line image LN included in the test chart 500 is a longitudinal line, and "longitudinal" direction means a direction parallel to the conveyance direction, indicated by the arrow in FIG. 5, of the recording material P. On the other hand, in addition to the longitudinal line, in the second embodiment, the test chart 501 which further includes a lateral line is used, and "lateral" direction means a direction parallel to a main scanning direction of the laser. The adjustment control of the image forming condition was performed based on the density, line width of the longitudinal line, and the line width of the lateral line of the patch image PT. It is noted that the main scanning direction of the laser is also a direction perpendicular to the longitudinal direction, therefore, the lateral direction is a direction perpendicular to the main scanning direction of the laser. The configuration of the image forming apparatus 100 is similar to that of the first embodiment, therefore the description thereof is omitted.

Density-Line Width Correction Control

FIG. 9 illustrates an example of a test chart 501 of a density-line width correction control in the second embodiment. The test chart 501 includes a patch image PT, a line image LN1 which is a longitudinal line, and a line image LN2 which is a lateral line, the patch image PT is formed by 100% density signal for each color of yellow (Y), magenta (M), cyan (C), and black (K), respectively. The line image LN1 is the same as that of line image LN of FIG. 5 in the first embodiment, and the line image LN2 is a lateral line having a line width of two lines at 600 dpi as the predetermined line width, and has a length of 10 mm. As to the density of the patch image PT, similar to the first embodiment, a target T of the optical density of 100% patch is set to 1.5.

The longitudinal line and the lateral line may have different line widths for the reasons described below. In the image forming apparatus 100 which uses the laser scanner 3 as an exposure unit, as in the second embodiment, the scanning direction of the laser scanner 3 is the direction of A illustrated in FIG. 9, and, in a case where the line image LN1 which is a longitudinal line is to be formed, a laser beam is irradiated for two dots in the scanning direction with a resolution of 600 dpi. Then, the laser beam is irradiated, at two dots lower position, for two dots at the time of the next scanning with the resolution of 600 dpi. By repeating such irradiation, a latent image of the longitudinal line having the line width of two dots is formed.

On the other hand, when forming line image LN2 of a lateral line, continuing irradiation is performed over a period of time corresponding to the length of the line with the resolution of 600 dpi in the scanning direction. By performing the continuing irradiation over the period of time corresponding to the length of the line similarly at time of the next scan, the latent image of the lateral line having two dots width is formed. Therefore, for the longitudinal lines and the lateral lines, the shapes of the latent images on the photosensitive drums 1*a*, 1*b*, 1*c*, and 1*d* differ from each other. The spot shapes on the surface of the photosensitive drum, for the longitudinal direction and the lateral direction, at the time of irradiation by the exposure unit may differ from each other in diameter, and due to its influence, the shapes of the latent images for the longitudinal line and the lateral line may differ from each other. The difference in such spot shapes is not limited to the laser scanner 3; rather, it may occur also in the image forming apparatus 100 which uses the exposure unit in which light emitting elements, such as LEDs, are arranged. Further, in a development process, peripheral speeds of the photosensitive drums 1*a*, 1*b*, 1*c*, and 1*d* and developing sleeves 41*a*, 41*b*, 41*c*, and 41*d* may differ. Furthermore, in a transfer process, velocities of the photosensitive drums 1*a*, 1*b*, 1*c*, and 1*d* and the intermediate transfer belt 11 may differ, and the velocities of the intermediate transfer belt 11 and the recording material P at the position where they face each other may also differ. The line width of the horizontal line may tend to change in these cases.

In the second embodiment, image forming of the test chart 501 is performed with changing the image forming conditions, as in the first embodiment. Specifically, the image forming is performed with changing the laser light amount (light amount condition) of the semiconductor laser and changing conditions of potential (potential condition) of the photosensitive drums 1*a*, 1*b*, 1*c*, and 1*d* and the developing sleeve 41*a*, 41*b*, 41*c*, and 41*d*. The line image LN2 and line image LN2 are included in the test chart 501. As in FIG. 5, the main scanning direction of the laser is indicated by arrow A and the conveyance direction of the sheet is indicated by arrow B. The laser light amounts LP1-LP3 and the potential conditions V1-V4 are the same as in the first embodiment. The line image LN and the patch image PT are formed in the upper stream side (left-hand side in FIG. 9) with a condition of laser light amount LP1. As in the first embodiment, based on the flow chart of FIG. 6, the density-line width correction control was performed.

Table 3 is a table illustrating the optical density of the patch image PT of black, and Table 1 is calculated, in Step S104 of FIG. 6, from the test chart 501 that is formed with changing the exposure condition and the potential condition. Table 4 is a table illustrating the line width of the line image LN1, which is a longitudinal line, of black, and the line width of the line image LN2, which is a lateral line, in the test chart 501 that is formed with changing the exposure condition and the potential condition. As to the patch image PT, its condition is the same as the condition of the first embodiment, and Table 3 also illustrates that the same result as Table 1 in the first embodiment is acquired.

TABLE 3

| PATCH DENSITY | | EXPOSURE CONDITION (DRUM SURFACE LIGHT AMOUNT) | | |
|---|---|---|---|---|
| | | LP1 0.16 (μJ/Cm²) | LP2 0.24 (μJ/Cm²) | LP3 0.32 (μJ/Cm²) |
| POTENTIAL CONDITION (CHARGING DC VOLTAGE) | V1: −550 V | 1.13 | 1.25 | 1.34 |
| | V2: −600 V | 1.33 | 1.43 | 1.52 |
| | V3: −650 V | 1.48 | 1.56 | 1.65 |
| | V4: −700 V | 1.60 | 1.70 | 1.79 |

TABLE 4

| PATCH DENSITY | | | EXPOSURE CONDITION (DRUM SURFACE LIGHT AMOUNT) | | |
|---|---|---|---|---|---|
| | | | LP1 0.16 (μJ/Cm²) | LP2 0.24 (μJ/Cm²) | LP3 0.32 (μJ/Cm²) |
| POTENTIAL CONDITION (CHARGING DC VOLTAGE) | V1: −550 V | LON. | 82(μm) | 98(μm) | 120(μm) |
| | | LAT. | 84(μm) | 102(μm) | 127(μm) |
| | V2: −600 V | LON. | 86(μm) | 102(μm) | 125(μm) |
| | | LAT. | 88(μm) | 108(μm) | 132(μm) |
| | V3: −650 V | LON. | 90(μm) | 107(μm) | 132(μm) |
| | | LAT. | 92(μm) | 113(μm) | 140(μm) |
| | V4: −700 V | LON | 95(μm) | 112(μm) | 139(μm) |
| | | LAT. | 98(μm) | 120(μm) | 148(μm) |

In Table 4, as to the line image LN1, which is a longitudinal line (illustrated as "LON." in Table 4), the results of the line image LN1 are the same as the results of the line image LN (longitudinal line) of Table 2. For example, in both Table 2 and Table 4, in a case where the laser light amount is LP1 (0.16 μJ/cm²) and the potential condition is V1 (−550V), the line width is 82 μm. On the other hand, in Table 4, the line width of line image LN2, which is a lateral line (illustrated as "LAT." in Table 4), is 84 μm. Thus, it is illustrated that line widths differ in line images LN1 and LN2. In Table 4, the line widths in the line images LN1 and LN2 differ in any combination of the potential condition and the exposure condition.

FIG. 10 is a graph illustrating the optical densities of these patch images PT and the line width of the line image LN1 and line image LN2. As in FIG. 8, in FIG. 10, the lateral axis is the optical density of the patch image PT, and the longitudinal axis is the line width (μm). Also in the second embodiment, the target of the optical density of 100% patch is set as 1.5 (indicated by "Dens_target" in FIG. 8). The target (indicated by "Width_target" in FIG. 8) of the line width in two dots line of 600 dpi is set as 100 (μm). Therefore, the target T in FIG. 10 is the same as that in FIG. 8. On the other hand, in the second embodiment, even if the potential condition and the exposure condition are the same, the line width of the line image LN1, which is a longitudinal line, differs from that of the line image LN2, which is a lateral line. Therefore, the potential condition and the exposure condition are determined such that an average of the line widths becomes the target T.

In the second embodiment, as in the first embodiment, the CPU 301 calculates the potential condition and the exposure condition by performing linear interpolation within the range in which the target T is included. As to the potential condition, the first embodiment and the second embodiment are the same, however, as to the line width, two line images LN1 and LN2 are used in the second embodiment. Therefore, in the second embodiment, as to the line width, the CPU 301 uses an average value of the line image LN1 and the line image LN2. For example, in a case where the potential condition is −550V and the exposure condition is 0.16 μJ/cm², the line width is (82+84)/2=83. As a result, in the second embodiment, a DC voltage of the charging high-voltage as the potential condition is calculated to be −630V, and the exposure condition is calculated to be 0.21 μJ/cm². From this result of calculation, the CPU 301 determines the potential condition to be −630V and the exposure condition to be 0.22 μJ/cm². Thereby, the potential condition and the exposure condition in the image forming station Pd of black are determined, it is noted that the DC voltage of development voltage is decided to be −480V, in consideration of the fog removal potential of 150V. Further, the primary transfer voltage is determined to be +970V.

Similarly, for each of the image forming stations Pa, Pb, and Pc of cyan, magenta, and yellow, the potential condition and the exposure condition are determined such that optical density of the patch image PT is 1.5 and the width is 100 μm. These potential conditions and the exposure conditions are stored in a memory as image forming conditions, and are reflected in the potential conditions and the exposure conditions at the time of subsequent image forming. Thus, the image forming condition for acquiring both a desired line width and a desired density can be determined.

Also in the second embodiment, the above density-line width correction control is performed periodically, such as when installing the image forming apparatus 100, when circumstances such as the temperature and the humidity of the setting position of the image forming apparatus 100 are changed, and when the number of supplied sheets of the image forming apparatus 100 has reached a predetermined number. Thus, regardless of individual differences or a condition of use of the image forming apparatus 100, the optical density at high density and the line width of a fine line can be properly adjusted, and the image of proper quality can be output from a low image ratio to a high image ratio.

In the second embodiment, it is determined that the average value of the line width of the longitudinal line image LN1 and the line width of the lateral line image LN2 is the target of the line width, and a value of an arithmetic mean is used as the average value. However, other types of averages, such as a geometric average (geometric mean), a harmonic average, and a logarithm average, may be selected as the average value. It is possible to acquire, from the value of the line width of the line image LN1 and the value of the line width of the line image LN2, a value that is between the value of the line width of the line image LN1 and the value of the line width of the line image LN2 using any method, to determine the acquired value as the average value. Otherwise, the thinner one of the longitudinal line and the lateral line, i.e., the line having a smaller reading value of the line width, may be determined to be the target value of the line width (in this example, 100 μm). It is noted that the narrower the line width, the more likely faintness or breakage, etc., may occur. Therefore, in some cases, it may be desirable to control the image with a narrower line width to achieve the desired line width.

Third Embodiment

Figure 11:
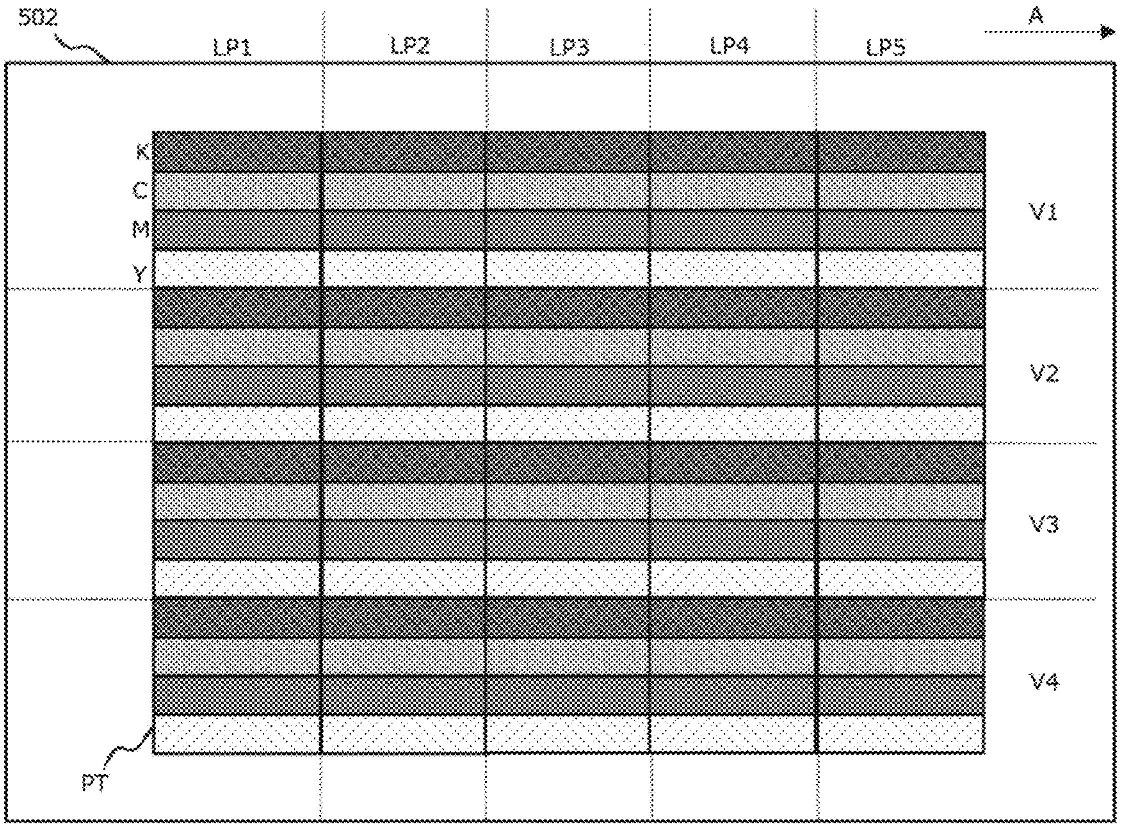
FIG. 11 is an explanatory diagram of a test chart in the third embodiment.
Figure 12:
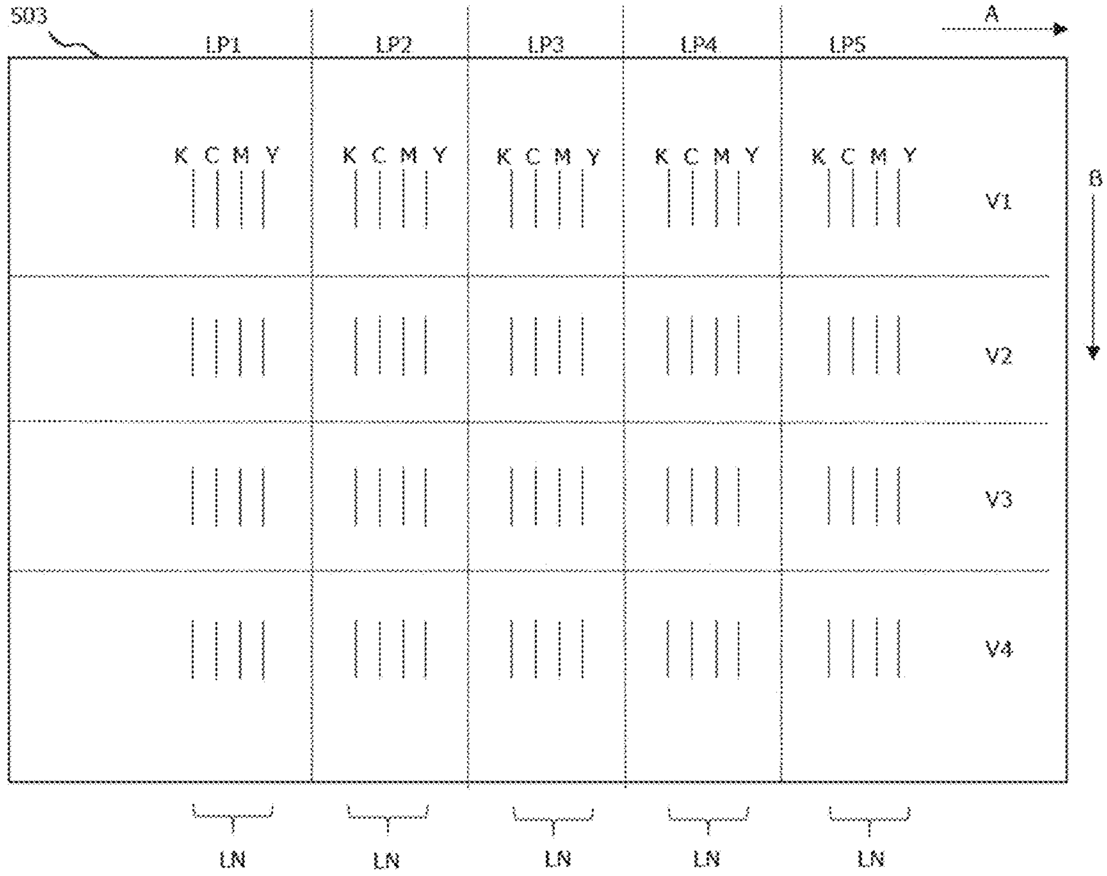
FIG. 12 is an explanatory diagram of a test chart in the third embodiment.
Figure 13:
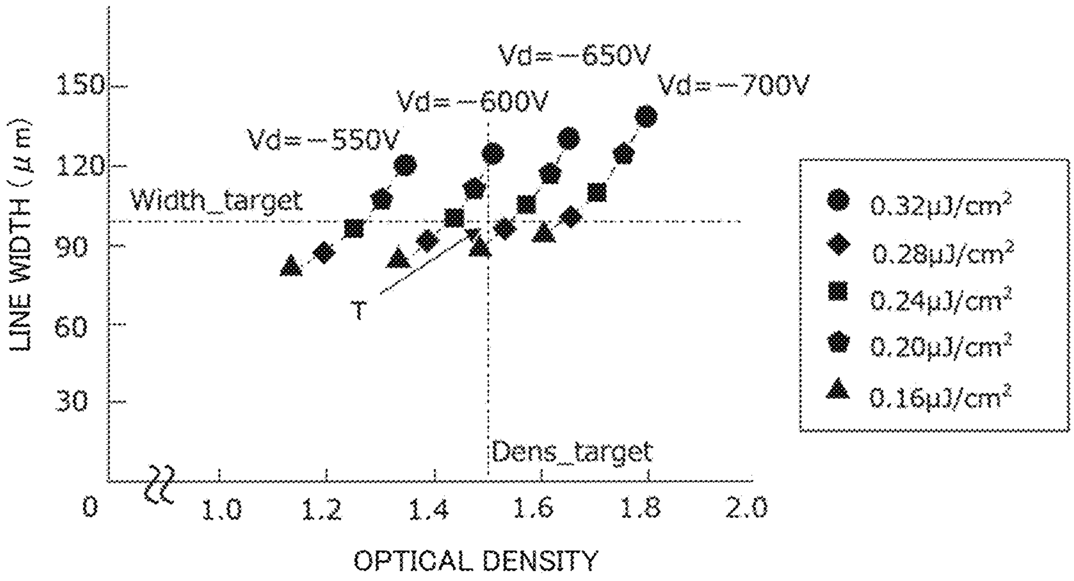
FIG. 13 is a graph illustrating line widths of line images and optical densities of patch images in a case where an exposure condition and a potential condition are changed in the third embodiment.

With reference to FIG. 11, FIG. 12, and FIG. 13, the third embodiment will be described below. In the first embodiment and the second embodiment, the patch image PT and the line image are included in a single test chart. On the other hand, in the third embodiment, a test chart for the patch image PT and a test chart for the line image are used individually. The configuration of the image forming apparatus 100 is similar to that of the first embodiment, therefore the description thereof is omitted.

Density-Line Width Correction Control

FIG. 11 and FIG. 12 illustrate the test chart 502 and the test chart 503 of the density-line width correction control in the third embodiment. The test chart 502 includes a patch image PT which is formed by a 100% density signal for each color of yellow (Y), magenta (M), cyan (C), and black (K), respectively. Further, the test chart 503, as illustrated in FIG. 12, includes a line image LN which is a longitudinal line and is formed by a 100% density signal for each color of yellow (Y), magenta (M), cyan (C), and black (K), respectively.

Similar to the first embodiment, as to the test charts 502 and 503 in the third embodiment, the image forming is performed with changing a laser light amount (light amount condition) of the semiconductor laser and changing conditions of potential (potential condition) of the photosensitive drums 1*a*, 1*b*, 1*c*, and 1*d* and the developing sleeves 41*a*, 41*b*, 41*c*, and 41*d*. However, as to the exposure condition, the laser light amount is changed in 5 steps from LP1-LP5. As to the laser light amount LP1, the surface light volume at the photosensitive drums 1*a*, 1*b*, 1*c*, and 1*d* is 0.16 μJ/cm$^2$, the laser light amount LP2 is 0.20 μJ/cm$^2$, and the laser light amount LP3 is 0.24 μJ/cm$^2$. Further, the laser light amount LP4 is 0.28 μJ/cm$^2$, and the laser light amount LP5 is 0.32 μJ/cm$^2$. The potential conditions V1-V4 are the same as in the first embodiment. In each image forming condition, the positions of the test charts 502 and 503 in the chart are the same. Other conditions are the same as in the second embodiment. In the third embodiment, as in the first embodiment, the density-line width correction control was performed based on the flow chart of FIG. 6.

Table 5 is a table illustrating the optical density of the patch image PT of black, and Table 1 is calculated, in Step S104 of FIG. 6, from the test chart 502 which is formed with changing the exposure condition and the potential condition. Further, Table 6 is a table illustrating the line width of the longitudinal line image LN of black, and Table 1 is calculated, in Step S105 of FIG. 6, from the test chart 503 which is formed with changing the exposure condition and the potential condition.

TABLE 5

| PATCH DENSITY | | EXPOSURE CONDITION (DRUM SURFACE LIGHT AMOUNT) LP1 0.16 (μJ/Cm$^2$) | LP2 0.20 (μJ/Cm$^2$) | LP3 0.24 (μJ/Cm$^2$) | LP4 0.28 (μJ/Cm$^2$) | LPS 0.32 (μJ/Cm$^2$) |
|---|---|---|---|---|---|---|
| POTENTIAL CONDITION (CHARGING DC VOLTAGE) | V1: −550 V | 1.13 | 1.19 | 1.25 | 1.31 | 1.34 |
| | V2: −600 V | 1.33 | 1.38 | 1.43 | 1.47 | 1.52 |
| | V3: −650 V | 1.48 | 1.53 | 1.56 | 1.61 | 1.65 |
| | V4: −700 V | 1.60 | 1.66 | 1.70 | 1.75 | 1.79 |

TABLE 6

| PATCH DENSITY | | EXPOSURE CONDITION (DRUM SURFACE LIGHT AMOUNT) LP1 0.16 (μJ/Cm$^2$) | LP2 0.20 (μJ/Cm$^2$) | LP3 0.24 (μJ/Cm$^2$) | LP4 0.28 (μJ/Cm$^2$) | LP5 0.32 (μJ/Cm$^2$) |
|---|---|---|---|---|---|---|
| POTENTIAL | V1: −550 V | 82 (μm) | 87 (μm) | 98 (μm) | 109 (μm) | 120 (μm) |
| CONDITION | V2: −600 V | 86 (μm) | 91 (μm) | 102 (μm) | 113 (μm) | 125 (μm) |
| (CHARGING | V3: −650 V | 90 (μm) | 96 (μm) | 107 (μm) | 119 (μm) | 132 (μm) |

TABLE 6-continued

| PATCH DENSITY | | EXPOSURE CONDITION (DRUM SURFACE LIGHT AMOUNT) LP1 0.16 (μJ/Cm²) | LP2 0.20 (μJ/Cm²) | LP3 0.24 (μJ/Cm²) | LP4 0.28 (μJ/Cm²) | LP5 0.32 (μJ/Cm²) |
|---|---|---|---|---|---|---|
| DC VOLTAGE) | V4: −700 V | 95 (μm) | 101 (μm) | 112 (μm) | 125 (μm) | 139 (μm) |

FIG. 13 is a graph illustrating optical densities of these patch images PT and the line width. As in FIG. 8 and FIG. 10, in FIG. 13, the lateral axis is the optical density of the patch image PT, and the longitudinal axis is the line width (μm). Also in the third embodiment, the target of the optical density of 100% patch is set as 1.5, and the target of the line width of the line of two dots at 600 dpi is set as 100 μm. Therefore, the target T in FIG. 13 is the same as that in FIG. 8 and FIG. 10.

As in the first embodiment, the CPU 301 calculates the potential condition and the exposure condition for acquiring the optical density of 1. 5 and the width of 100 μm by performing linear interpolation within the range in which the target is included. As a result, the DC voltage of the charging high-voltage as the potential condition is calculated to be −630V, and the exposure condition is calculated to be 0.22 μJ/cm$^2$. From this result of calculation, the CPU 301 determines the potential condition to be −630V and the exposure condition to be 0.22 μJ/cm$^2$. Thereby, the potential condition and the exposure condition in the image forming station Pd of black are determined. It is noted that the DC voltage of development voltage is decided to be −480V, in consideration of the fog removal potential of 150V. Further, the primary transfer voltage is determined to be +970V.

Similarly, for each of the image forming stations Pa, Pb, and Pc of cyan, magenta, and yellow, the potential condition and the exposure condition is determined such that the optical density is 1. 5 and the width is 100 μm. These potential conditions and the exposure conditions are stored in a memory as image forming conditions, and are reflected in the potential conditions and the exposure conditions at the time of subsequent image forming. Thus, the image forming condition for acquiring both a desired line width and a desired density can be determined.

Also in the third embodiment, the above density-line width correction control is performed periodically, such as when installing the image forming apparatus 100, when circumstances such as a temperature and a humidity of the setting position of the image forming apparatus 100 are changed, and when the number of supplied sheets of the image forming apparatus 100 has reached a predetermined number. Thus, regardless of individual difference or a condition of use of the image forming apparatus 100, the optical density at high density and the line width of a fine line can be properly adjusted, and an image of proper quality can be output from a low image ratio to a high image ratio.

In the third embodiment, the patch image PT of the 100% density signal of the test chart 502 and the line image LN of the 100% density signal of the test chart 503 are formed at approximately the same position in the main scanning direction of the laser under the same conditions. For example, in the test charts 502 and 503, both the patch image PT and the line image LN, which are formed with the laser light amount LP1 and the potential condition V1, are formed at the left position of the drawing. Therefore, these corresponding patch images PT and the line images LN are less influenced by density unevenness in the main scanning direction of the laser and the like. Since more data of the patch density and the line width is added by using two test charts, i.e., the test chart 502 and the test chart 503, the correction accuracy is also increased.

In the third embodiment, the test charts 502 and 503 are formed by performing image forming on two recording materials of A4 size and outputting the same, and a correction control is performed by scanning the two test charts. However, the present disclosure is not restricted to this, for example, even in a case where the correction control is performed by scanning a single test chart of A3 size on which the images of the test charts 502 and 503 are formed, the same effect as in the above example can be acquired.

As described above, in the first embodiment to the third embodiment, a test chart including a plurality of test images, each formed under different image forming conditions, is formed, then, an image forming condition is determined such that an image having a predetermined density and a predetermined line width is acquired based on a reading result of the test chart. The image forming condition includes a plurality of conditions which influences the density and the line width, the potential condition of the photosensitive member as a first condition, and the light amount condition of the semiconductor laser of the laser scanner 3, which is an exposure unit, as a second condition.

However, the conditions included in the image forming conditions are not restricted to the above, and it is possible to use another condition or three or more types of conditions. For example, in addition to the potential condition and the light amount condition, or instead of one of the potential condition and the light amount condition, a temperature condition (for example, the temperature of the fixing roller in the fixing unit 9) or the other conditions may be used. In the prior art, after acquiring the image forming condition using a test chart including an image formed by changing the first condition (for example, the potential condition), the image forming condition is adjusted using a test chart including an image formed by changing the second condition (for example, the light amount condition).

On the other hand, in the first embodiment to the third embodiment, each of the test charts 501-503 includes images formed such that at least one of the value of the first condition and the value of the second condition differ from each other. Unlike the prior art, in the present disclosure, by determining the image forming condition based on both the first condition and the second condition, it is possible to acquire images having a predetermined density and the predetermined line width. As a result, even in a case where the first condition and the second condition have a correlation that influences each other with respect to the density and the line width of the formed image, it is possible to calculate the value of the first optimal condition and the value of the second condition considering the influence of the correlation.

In the first embodiment to the third embodiment, individual images (i.e., the line image LN and the patch image PT) are used in reading the line width and the reading of density of the image. However, a single image may be used as long as the line width and the density can be read with sufficient accuracy.

As explained above, in the prior art, one of the exposure condition and the potential condition is determined from the line width of the line image LN, and the other of the exposure condition and the potential condition is determined from the density of the patch image PT. However, the line width of the fine line and the density of the 100% image ratio change according to the exposure condition and the potential condition. Therefore, in a case where these are determined sequentially, the patch density will change according to the line width in the last determination, or the line width will change according to the patch density. Therefore, at least one of the line width and the density changes from a desired value, so it is not possible to acquire desired values for both the line width and the density.

On the other hand, in the first embodiment to the third embodiment, the test charts 501, 502, and 503, which include the patch image PT and the fine line image, are output with changing the potential condition and the light amount condition by the exposure unit. Then, based on the density and the line width which are acquired by reading the output test chart, the potential condition and the exposure condition are determined such that the desired density and the desired line width are acquired. Thus, it is possible to acquire the desired values for both the line width and the density. Therefore, it is possible to provide a proper image for the image of a low image ratio such as a text document, and the image of a high image ratio such as a photograph or a graphic image. In addition, according to the present disclosure, the image forming condition for acquiring both the desired line width and the desired density can be determined in the image forming apparatus.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-063111, filed Apr. 5, 2022, which is hereby incorporated by reference herein in its entirety.

What is claimed is:

1. An image forming apparatus comprising an image forming unit configured to form an image on a sheet, the image forming unit comprising:

a photosensitive member;

a charger configured to charge the photosensitive member based on a charging potential;

an exposure unit configured to expose the photosensitive member charged by the charger to light to form an electrostatic latent image on the photosensitive member, an exposure intensity of the exposure unit being controlled based on an exposure condition;

a developing sleeve configured to develop the electrostatic latent image; and one or more processors configured to perform operations including:

controlling the image forming unit to form a line test image and a width test image, wherein a length in a lateral direction, which is perpendicular to a longitudinal direction of the line test image, of the width test image is longer than a length in the lateral direction of the line test image, the line test image comprising:

a first line image formed based on a first charging potential and a first exposure condition;

a second line image formed based on a second charging potential, which is different from the first charging potential, and the first exposure condition; and a third line image formed based on the first charging potential and a second exposure condition, which is different from the first exposure condition, the width test image comprising:

a first width image formed based on the first charging potential and the first exposure condition;

a second width image formed based on the second charging potential and the first exposure condition; and a third width image formed based on the first charging potential and the second exposure condition, and generating the charging potential and the exposure condition based on a reading result of the line test image and a reading result of the width test image.

2. The image forming apparatus according to claim 1, wherein the operations further include:

controlling the image forming rut to form the line test image with a predetermined line width and the width test image with the predetermined line width; and controlling the image forming unit to form a patch image having a predetermined density.

3. The image forming apparatus according to claim 2, wherein the line test image is parallel to a conveyance direction of the sheet, and the width test image is perpendicular to the conveyance direction of the sheet.

4. The image forming apparatus according to claim 2, wherein the line test image is parallel to a conveyance direction of the sheet, and the width test image is perpendicular to the conveyance direction, and wherein the operations further include determining a value of the charging potential and a value of the exposure condition such that an average value of a reading result of a line width of the line test image and a reading result of a line width of the width test image are the predetermined line width.

5. The image forming apparatus according to claim 2, wherein the line test image is parallel to a conveyance direction of the sheet, and the width test image is perpendicular to the conveyance direction, and wherein the operations further include determining a value of the charging potential and a value of the exposure condition such that, between a reading result of a line width of the line test image and a reading result of a line width of the width test image, the smaller reading result is the predetermined line value.

6. The image forming apparatus according to claim 2, wherein the line test image and the width test image are each formed on a separate sheet.

7. The image forming apparatus according to claim 2, wherein the charging potential is a potential of the charger, and the exposure condition is a light amount of the exposure unit, and wherein the operations further include determining a value of the potential of the charger and a value of the light amount of the exposure unit such that both the predetermined density and the predetermined line width are acquired.

8. The image forming apparatus according to claim 2, wherein the operations further include:

acquiring, for each of the line test image and the width test image, a reading value of the predetermined line width and a reading value of the predetermined density; and determining, from a relationship between a value of the charging potential and a value of the exposure condition, the value of the charging potential and the value of the exposure condition such that both the predetermined line width and the predetermined density are acquired.

9. The image forming apparatus according to claim 1, wherein the operations further include controlling the image forming unit to form the line test image and the width test image, with changing at least one of a value of the charging potential and a value of the exposure condition, to form the line test image and the width test image.

* * * * *